United States Patent [19]
Toon

[11] Patent Number: 5,255,945
[45] Date of Patent: Oct. 26, 1993

[54] END-TO-END JOINTING SYSTEM FOR TUBES AND PIPES

[75] Inventor: Donald A. Toon, Burlington, Canada

[73] Assignee: Solinst Canada Limited, Ontario, Canada

[21] Appl. No.: 804,227

[22] Filed: Dec. 2, 1991

[51] Int. Cl.5 ............................................. F16L 37/14
[52] U.S. Cl. .................................... 285/305; 285/423
[58] Field of Search ...................... 285/80, 332.4, 418, 285/382.7, 305, 423; 292/256.5

[56] References Cited

U.S. PATENT DOCUMENTS

| | | | |
|---|---|---|---|
| 2,436,407 | 2/1948 | Stephens | 292/256.6 X |
| 2,597,482 | 5/1952 | Harrison et al. | 285/305 |
| 2,645,513 | 7/1953 | Sterrett | 292/256.6 |
| 2,839,218 | 6/1958 | Zerbe | 292/256.6 X |
| 3,479,067 | 11/1969 | Potts | 285/305 X |
| 4,128,265 | 12/1978 | Fenster et al. | 285/305 |
| 4,427,221 | 1/1984 | Shay, Jr. | 285/305 |
| 5,083,820 | 1/1992 | Hopperdietzel | 285/305 |

Primary Examiner—Richard E. Moore
Attorney, Agent, or Firm—Anthony & Asquith & Co.

[57] ABSTRACT

The system is used for connecting sections of plastic tubing which form a sampling pipe for a well, in which a nose of one tube engages a sleeve on the neighboring tube. The system is an improvement to the tangential-key type of tube jointing system, where a flexible key passes through a key-hole in the sleeve, and around the circumference of the key-groove. The now system includes a rectangular key in place of the usual round key. Also shown is an O-ring seal, which resides in a seal-groove cut in the nose, outboard of the key-groove.

12 Claims, 3 Drawing Sheets

END-TO-END JOINTING SYSTEM FOR TUBES AND PIPES

This invention relates to a manner of joining lengths of tubing together. The invention is for use particularly in joining lengths of tubing together to form pipes of the kind that are inserted into wells and other boreholes. Typically, such pipes house the conduits and lines for extracting samples of groundwater from the well.

BACKGROUND TO THE INVENTION

A pipe system which is to operate in a borehole usually consists of many lengths or sections of tubing which are assembled end to end to each other. The sections or lengths are typically 2 meters long, and a typical pipe may include 50 or more sections. The pipe will typically also include one or more shorter special sections which, for example, house a well-screen or other sample draw-off port.

The diameter of the pipe depends on the size of the well and the type of measurements to be taken. In a typical case, the diameter of the pipe may be 5 or 6 cm.

It is common for the tube sections of sampling pipes to be made of a non-degradable plastic, such as PVC. When metal is called for (as, for instance, in the said special sections) a stainless steel is preferred, since other metals cannot be relied on not to corrode nor to introduce spurious traces of chemicals which might taint the samples.

One of the requirements of a sampling pipe is that the sections should be quickly and easily assemble-able to each other. Screw threads are common as a mechanical jointing means between sections, and are quite reliable, although expensive to make and time-consuming in use. It has been proposed also to join the plastic pipes together by heat-welding.

One conventional system by which sections of pipe have been joined together may be termed the "tangential-key" system. Here, a key groove is provided between the two sections to be joined together, and a key-hole is provided, through a key may be inserted from outside the tube. The key passes circumferentially around inside the key-groove. A tag of the key may be left protruding from the key-hole, whereby the key can be withdrawn for disassembly.

The tangential-key system provides only axial or lengthwise location of the sections. The tangential-key system does not constrain the sections against relative rotation, but that is usually of little consequence in a sampling pipe.

The invention makes use of the tangential-key system, which is described in more detail below.

In addition to the mechanical jointing system between the sections, it is also usually a requirement, in a sampling pipe, that the sections be sealed together against water leakage and seepage. O-ring seals, residing in seal-grooves, are usually preferred. The seals are intended to prevent water in the well from seeping into the sampling pipe and to prevent liquids, and gases, inside the pipe from leaking out into the groundwater in the well.

One of the tribulations which attends the insertion of pipes into wells and boreholes is the fact that the well is often not straight. It is not uncommon to find that a well may deviate from the truly straight to the extent that adjacent tube sections might be forced to lie at an angle of 1 or 2 degrees, or even more, relative to each other. (Wells and other boreholes are usually nominally vertical, but sometimes are drilled at other angles.)

Even when the material of the tubes can accommodate distortion somewhat, of course the brunt of the distortion is experienced at the joint.

A characteristic of joint or junction design in previous sampling pipe systems has been that, at the junction, a separate coupling connector has been utilised, being a separate component from the tube sections themselves. Such previous coupling connectors have been of greater diameter than the tubes they are connecting.

It is recognised that the presence of coupling connectors of greater diameter than the sections of pipe is most disadvantageous, especially when the well is not quite straight. It is recognised as much more preferable that the wall thickness of the pipe should be constant along the complete length of the pipe, including the junctions.

The reason such previous coupling connectors have been larger in diameter than the rest of the pipe has usually been that the coupling connector has to house, and provide room for, the O-ring seal.

It is recognised that if the seal layout and arrangement can be such that the O-ring is accommodated within the nominal thickness of the pipe, the components required at the joint for mechanical support and for sealing can be accommodated within the tube sections themselves. It is recognised that when this is the case there then becomes no need, in fact, for the separate coupling connectors to be provided.

The invention is aimed at providing a layout of the junction components which permits the junction not to have an increase in diameter over the rest of the pipe. When that is done, the use of a separate coupling connector then becomes somewhat superfluous. However, separate coupling connectors still may be preferred in some cases, and the invention should not be construed as being limited only to the cases where the tube sections are joined directly to each other.

The invention is concerned with the very tight constraints on the designer regarding the radial dimensions of the components. Wall thicknesses should always be kept as thin as possible. Thus, the designer of sampling pipes and tubes should be constantly seeking to select the slimmest possible O-rings, because these occupy the least amount of radial space.

Nevertheless, the designer wishes to ensure that the O-rings do not leak, and the designer is aware of the usual rule that the slimmer the O-ring, the more tightly the dimensional and other tolerances must be controlled, otherwise the O-ring is likely to break contact with the surface against which it is intended to seal, and thus to leak.

In fact, O-rings are usually provided with sufficient radial squeeze or nip or pinch as is commensurate with the level of hydraulic pressure being supported by the O-ring: an O-ring may leak if the degree of nip is reduced by the out-of-round distortion, even if the seal does not nominally break contact.

Furthermore, in some borehole-sampling situations, it is not enough simply that the seal does not leak. For judicial evidence purposes, for instance, a very high standard of leakage resistance is required. In general, when the pipe is down a well, it is almost impossible to cure a leak; not only that, but special instruments may be required even to detect that the leak is taking place. Furthermore, it is not easy to detect whether the well is in fact straight, nor, if it is not, to determine the angle through which a pipe will be bent. Furthermore again, a pipe junction may leak due to being bent by the borehole, and yet that same pipe junction will display no tendency to leak at the surface, neither before installation into the well nor afterwards when the pipe has been removed.

The usual measure by which a designer copes with O-rings which are prone to leak due to pipe distortion is to provide fatter O-rings, which are more tolerant to distortion. But fat O-rings require thick walls.

Thus, in the case of well-sampling pipes, the problem of leaking seals is an especially demanding one, and at the same time the constraint on the dimensions of the seals is very tight.

The design compromise lies in selecting a seal, whether the usual O-ring or another type of seal, which neither leaks nor occupies much radial space. The invention is aimed at allowing this compromise to be eased, by so arranging the junction that even a slim seal is not prone to leak when the junction distorts.

GENERAL FEATURES OF THE INVENTION

The invention provides a jointing system for joining tube lengths or sections together end-to-end. A female end of one of the tubes is formed with a cylindrical sleeve, and a male end of an adjacent one of the tubes is formed with a complementary cylindrical nose. The nose is arranged to fit snugly inside the sleeve, and to be slidable into and out of the sleeve, and to be in direct sealing and locking engagement with the sleeve.

In the invention, the sleeve on the female end is provided internally with an outer key-groove, which is formed radially outwards into the material of the sleeve.

The nose on the male end is provided externally with an inner key-groove, which is formed radially inwards into the material of the nose.

In the invention, the outer key-groove in the sleeve and the inner key-groove in the nose are so arranged as to be in axial and radial alignment when the nose is fitted into the sleeve, whereby the inner and outer key-grooves together form a composite key-groove.

In the invention, the sleeve is provided with a key-hole right through the material of the sleeve, the key-hole being such that a key may be inserted therethrough, and the size and disposition of the key-hole are such that the key is insertable from outside the sleeve tangentially with respect to the composite key-groove.

In the invention, the tubes are components of an elongate pipe assembly which is adapted and arranged for lowering into a hole in the ground, and is so arranged that, when the key is inserted into the key-groove, the weight of tubes below the junction is supported by the key.

In the invention, the composite key-groove is square-sided, and the key is of a complementary rectangular cross-sectional shape.

Optionally, the nose on the male end is provided with a seal-groove, which is formed radially inwards into the material of the nose, and an elastomeric seal is housed in the seal-groove.

Preferably, the seal-groove and the composite key-groove are spaced apart axially along the length of the nose, and the seal-groove lies axially further out along the length of the nose than the composite seal-groove.

The benefit that arises from arranging the structure of the junction in the above-defined manner may be described as follows.

As mentioned, radial space is at a heavy premium in a sampling pipe. Every millimeter of radial thickness in the walls of the pipe must be strictly rationed, and especial attention must be given to the design of the junctions. One of the key factors in determining the radial thickness of the pipe at the junction is the depth of the seal-groove. The deeper the seal-groove, the thicker the O-ring that can be accommodated, but then the thicker the pipe wall that must be allowed by the designer.

One way in which the seal-groove may be deep, and yet the wall thickness of the pipe may be small, is to reduce the thickness of the material of the floor or base of the seal-groove.

Preferably, the axial length of the portion of the nose that lies between the seal-groove and the key-groove is shorter than the axial length of the portion of the nose that lies beyond the seal-groove.

Preferably, the axial length of the portion of the nose that lies between the seal-groove and the key-groove is shorter than the axial length of the portion of the nose that lies before the key-groove. Preferably, when the tubes of plastic material, the wall thicknesses of the sleeve and of the nose are such that the overall radial thickness of the junction is not more than about 1/20th of the diameter of the tube.

Preferably, in that case also, the radial thickness of the material of the nose which comprises the base of the seal-groove is not less than about 1/60th of the diameter of the tube.

Preferably, the edges of the outer key-groove in the sleeve are chamfered to such an extent as to ease sliding of the seal past the edges of the outer key-groove when the nose is being inserted into the sleeve.

DETAILED DESCRIPTION OF PREFERRED EMBODIMENT

By way of further explanation of the invention, an exemplary embodiment of the invention will now be described with reference to the accompanying drawings, in which.

In regard to the examples of apparatus shown in the accompanying drawings and described below which embody the invention, it should be noted that the scope of the invention is defined by the accompanying claims, and not necessarily by specific features of exemplary embodiments.

Figure 1:
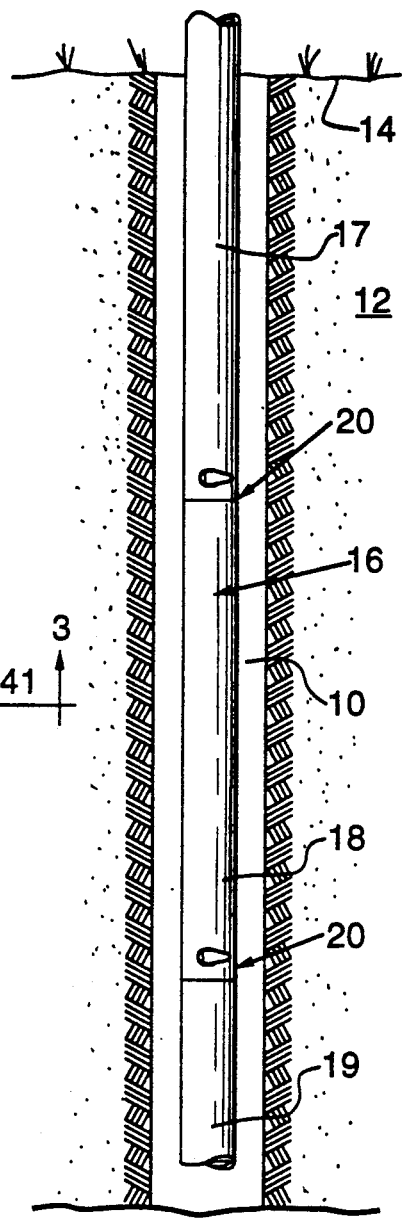
FIG. 1 is a cross-section of a borehole in the ground, showing a pipe passing theredown, the pipe being made from tube elements joined end to end in accordance with the invention.

In FIG. 1, a well 10 extends down into the ground 12 from the surface 14. A pipe 16 runs down the well 10.

The pipe 18 is made from many individual lengths or sections 17,18,19 of tubing. The lengths of tubing are joined together by means of keys, which engage in key-grooves, as will now be described.

Figure 2:
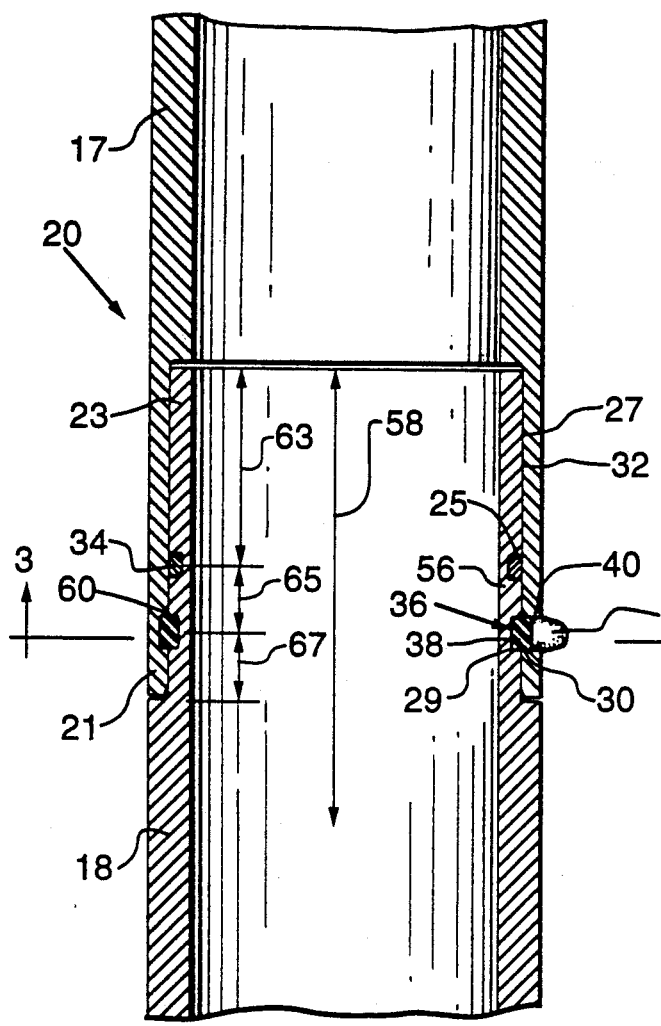
FIG. 2 is a cross-section of one of the junctions between adjacent tube elements.

One of the junctions 20 is shown in FIG. 2. The upper tube 17 is provided at its lower end with the female portion of the junction, which comprises a sleeve 21. The lower tube 18 is provided at its upper end with the corresponding male portion of junction, which comprises a nose 23. The nose 23 is slidable into, and fits snugly within, the sleeve 21.

A groove, being the seal-groove 25, is cut radially inwards into the material of the nose 23, from the outer surface 27 thereof.

A second groove, being the inner key-groove 29, is likewise cut radially inwards into the material of the nose. Apart from the grooves 25,29 the outer surface 27 of the nose is right-cylindrical. A third groove, being the outer key-groove 30, is cut radially outwards into the material of the sleeve 21, from the inner surface 32 thereof. Apart from the outer key-groove 30, the inner surface 32 of the sleeve is right-cylindrical.

An O-ring seal 34 is carried in the seal-groove 25 in the nose 23.

The finish of the inner surface 32 of the sleeve should be suitably smooth and free from burrs etc. so as not to damage the seal 34 as the junction 20 is being assembled, and so that the seal is ensured a sound operative engagement with a smooth surface both during deployment and during operation of the pipe.

The inner key-groove 29 and the outer key-groove 30 are in axial alignment, thereby forming a composite key-groove 36 when the nose 23 is inserted into the sleeve 21.

The pipe 16, as described, makes use of the "tangential-key" jointing system. A key 38 is housed within the composite groove 36. The key 38 thus simultaneously engages both the inner key-groove 29 and the outer key-groove 30. The key 38, when present, will act, as will be understood from FIG. 2, to prevent relative movement in the axial sense between the tube 17 and the tube 18. The weight of the tube 18, and of tube 19 and any further tubes below, is suspended on the engagement of the key 38 with the key-groove 36.

The key 38 is made from a strip of rectangular plastic material, which is flexible but strong. The sleeve 21 is provided with a key-hole 40, right through the material of the sleeve 21, through which the key 38 may be inserted. Upon insertion, the key enters the composite key-groove 36 in the tangential direction, and then travels right around the circumference of the groove. When the key is fully inserted, a tail or tag 41 of the key 38 protrudes through the key-hole 40.

To assemble the pipe 16 into the well 10, the tube lengths 17 et al may be assembled together and laid out flat on the ground surface, prior to insertion of the whole pipe down into the well. Alternatively, the tube lengths may be joined together progressively, i.e. as each length is lowered into the well. In respect of each junction 20 in turn, the nose 23 is assembled to the sleeve 21 and then the key 38 is inserted, and the pipe is only complete when the last tube element has been lowered into the well.

When withdrawing the pipe from the well, as each junction 20 emerges in turn at the ground surface 14, the tag 41 of the respective key 38 is removed, and the pipe is broken down progressively into its element tubes.

Figure 4:
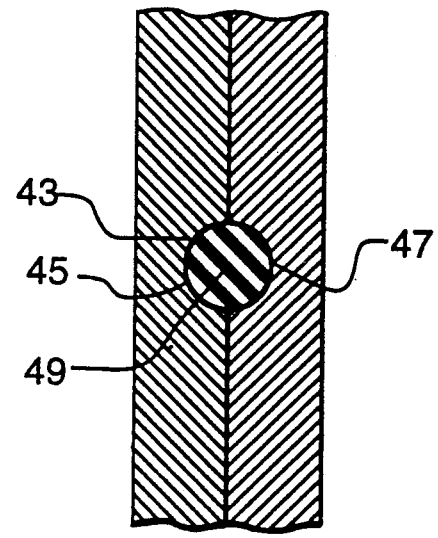
FIG. 4 shows a prior art coupling, in cross-section corresponding to a portion of FIG. 2.

FIG. 4 shows a prior-art version of the tangential-key system. Here, the composite key-groove 43 is circular, in that the inner and outer key-grooves 45,47 are semi-circular, and the key itself 49 also is circular.

During deployment, and in operation, of the pipe shown in FIG. 4, the weight of the lower sections is supported, at each of the junctions, by the engagement of the key 49 at that junction with the side walls of its respective key-grooves. When the pipe is hanging straight down, the stresses in the keys and grooves due to this weight are quite light, and easily accommodated by the circular type of tangential key system as shown in FIG. 4.

However, it is not the weight of the pipe that causes the major problem. If the well 10 is not straight, the pipe is forced into a bent condition. (The pipe must follow the distortion: the well of course remains as it is.) This bending of the pipe, if through more than a degree or two, can place enormous stresses on the key.

Figure 5:
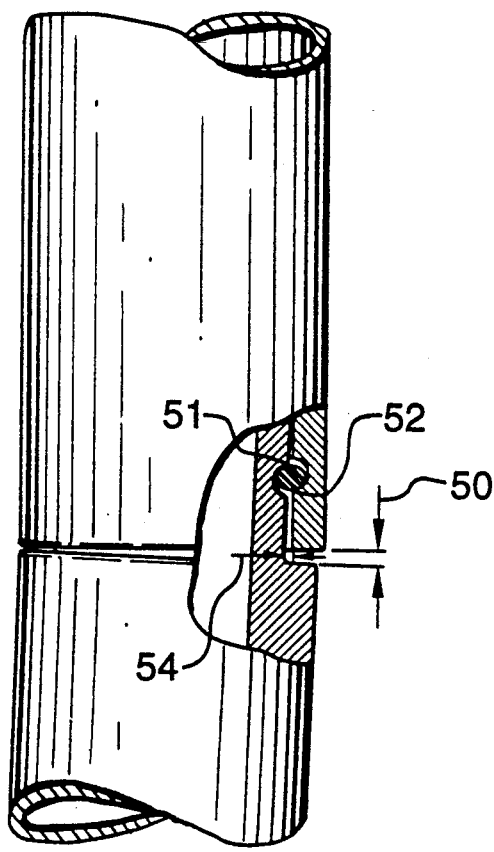
FIG. 5 shows the coupling of FIG. 4 when subject to a bending distortion.
Figure 6:
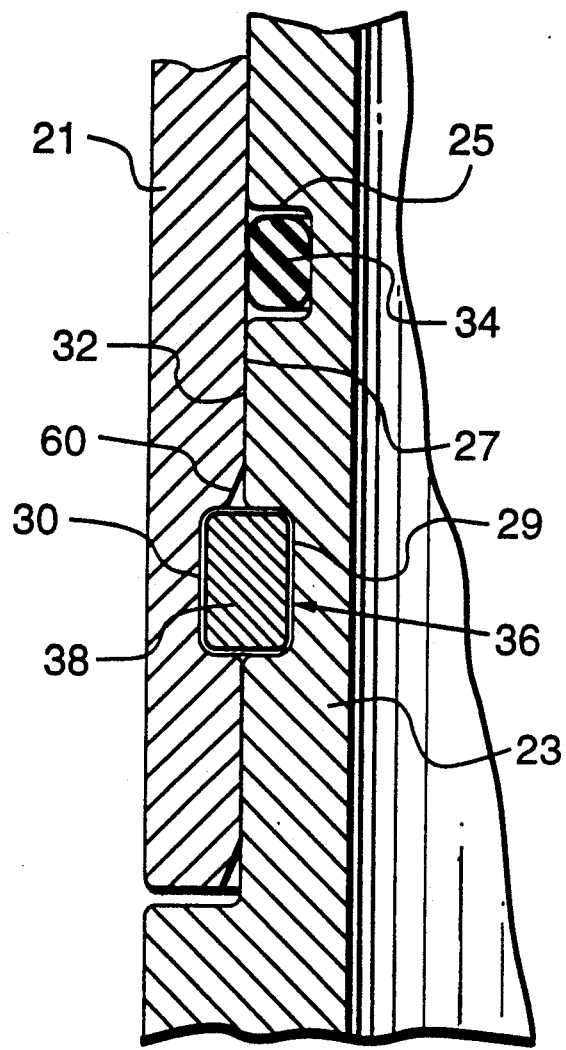

When two abutting tubes of diameter 5 cm or so are bent through an angle of 1 degree, then, as shown in FIG. 5, an axial gap 50 of 0.5 mm would, if no key were present, open up between the tube ends at the tension side of the bent junction.

The key 49 provides the axial resistance forces which act to resist the opening of such an axial gap 50 (as also would a screw-thread connection for example) and thereby to transfer some of the distortion induced by the bending, away from the junction and into the tube lengths.

The result is that a very heavy contact force is generated between points 51,52 and the key 49, as shown in FIG. 5. Not only does the axial gap open, as at 50, but also a radial gap opens at the tension side, as indicated at 54. This makes matters worse, as may be seen, because the heavy forces at points 51,52 are now being transferred up the circularity or arc of the key to points where a tangent to the key surface is inclined at a significant angle; therefore, the heavy forces at 51,52 generate a radial component of the forces, which itself urges the radial gap 54 to increase in size.

The O-ring, in its groove (not shown in FIG. 5) is close by. The appearance of the gap 54 on the tension side causes the nip on the O-ring to be reduced on the tension side, and can even cause the O-ring to break contact with the engagement surface and leak.

So, if the key is unable to resist these heavy stresses put upon it during bending of the junction, an axial gap 50 opens up during bending, and with it a radial gap 54. And, once a radial gap becomes established, the shape of the round key creates components of the force which tend to make the radial gap open up even further. Thus it is recognised that the use of a round key 49 exacerbates the tendency of the gap to open up, and thereby to reduce the nip of the seal on the tension side of a bend.

It is recognised that a pipe which uses round keys, and which is inserted into a not-exactly-straight well, will have an unacceptably high possibility of seal leakage at the junctions.

It will be noted that the problem with the round key is not caused necessarily by a deflection of the round key: the problem arises due to the round shape, and would occur even if the key were made of a perfectly rigid material.

A square key, as shown at 38 in FIGS. 1-4, on the other hand, is much more resistive to creating gaps which could lead to seal leakage. First, the square key engages the sides of the key-grooves 29,30 over a large axial abutment area. Second, even if a radial gap should start to appear due to distortion at the junction, the square key would provide no component of force which would tend to make matters worse, and to open up the gap.

So, a square key is very resistive to the opening of axial gaps. As a result, when a junction uses a square key, there is little tendency for a radial gap to open up, and therefore little tendency for the nip of the seal to be reduced. Furthermore, if a radial gap should in fact start to open up, the square key does not exacerbate matters in that the square key gives rise to no forces that might tend to open up the gap even wider. The amount of seal nip that is lost during pipe distortion, with a square key, is minimal; with a round key, the marked tendency to loss of seal nip can be a serious deficiency.

The improvement that comes from the use of the square key can be used to provide a greater reliability of the seal; or can be used to allow the designer to select a thinner O-ring and thereby to reduce the wall thickness; or a combination of both.

The O-ring 34 is spaced apart axially, on the nose 23, relative to the key 38. It is recognised that it is important to place the O-ring correctly on the nose, relative to the key, i.e. to place the O-ring groove 25 between the key-groove 29 and the remote end of the nose.

The reason for this positioning is that it is desired to keep the floor or base 56 of the O-ring groove as thin as possible; therefore, it is best if the floor of the O-ring groove is in an unstressed portion of the nose. If the O-ring groove were to be positioned before the key-groove, the thin floor of the seal groove would be in the load-line via which the axially-directed resistance to the opening of the axial gap is being resisted.

As mentioned, this axial resistance force can increase to very high values when the pipe is forced to bend; if the floor 56 of the seal-groove 25 were to lie in the load-line, and if the floor of the seal-groove were thin, the floor of the seal-groove might be damaged by being overstretched.

If the seal-groove 25 were to be placed in the said load-line, the designer would have to see to it that the floor 56 of the seal-groove would be thick enough to support the large axial forces that would then pass through the seal-groove floor. Placing the seal-groove in the unstressed portion of the nose, i.e. the portion 58 beyond the key-groove 29, allows the designer to provide only a minimum thickness of material in the groove floor 58.

The outer key-groove 30 includes the key-hole 40, whereby the key-groove is in communication in fact with the space outside the pipe. It is recognised that the seal 34 should be so placed with respect to the key-groove 30 that the seal 34 lies between the key-groove 30 and the inside of the pipe. As mentioned, to keep stresses down the seal 34 should lie in the unstressed portion of the nose 23, i.e. the portion 58 of the nose lying beyond the key-groove 29: as may be seen from FIG. 2, this position of the seal also is suitable from the point of view that the seal should lie between the key-groove and the inside of the pipe.

It is preferred also that the seal-groove should be cut in the material of the nose rather than in the material of the sleeve. With the seal groove 25 in the nose 23, the O-ring seal 34 is stretched into the groove 25, and, when the junction is being assembled the O-ring remains firmly in place. If the seal groove were to be cut in the material of the sleeve, the O-ring would only be held in place, before and during assembly, by its own rigidity, and a slim O-ring has very little rigidity.

One of the key aspects of the junction 20 as described is that the O-rings 34 can be of slim proportions, in cross-section. It is a general rule that O-rings mounted in a groove in a male component are more secure than O-rings mounted in a groove in a female component: it is recognised that this preference is even greater when the O-rings are of slim proportions.

Especially when the O-ring is as slim as is permitted in the invention, if the O-ring were to reside in a groove in the sleeve, instead of in a groove in the nose, the O-ring could hardly be relied upon to remain in the seal-groove during assembly under field conditions.

In short, it will be noted therefore that the seal-groove and key-groove arrangement of FIG. 2 fulfils the designer's requirements from three standpoints: (a) that the floor of the seal-groove is not in the axial load-line; (b) that the seal lies between the key and the inside of the pipe; and (c) that the seal-groove is cut in the male component, i.e. in the nose.

One possible difficulty that might be thought to follow from disposing the seal 34 beyond the key-groove is that the seal would be subject to nibbling as the seal 34 passes over the edges of the outer key-groove 30 upon assembly. Even when the components are made of plastic, some nibbling can occur, and of course with metal components, nibbling of O-rings as they slide over sharp edges upon assembly can be a serious problem. The usual solution to nibbling problems is to provide a lead-in chamfer in place of every sharp edge that the seal passes over.

With the square key-groove, there is little disadvantage which arises from breaking the corner 60 of the key-groove 30 so as to provide a lead-in chamfer: the abutment area that still remains for supporting axial loads is barely affected. This may be compared with breaking the corner 52 of the key-groove when the key is round, as in FIG. 4: even the slight removal of material from the corner 52 will significantly exacerbate the tendency for the forces generated by the shape of the round key 49 to pry the nose apart radially from the sleeve, and perhaps cause the seal to leak.

As a practical matter, when the key is square, lead-in chamfers can be provided, as at 60, and seal nibble upon assembling the O-rings over the key-groove can easily be eliminated as a problem, and without compromising other aspects of performance. When the key is round, however, it is seen that the measures that might be taken to cure nibbling of the seal upon assembly can have serious effects on the seal's reliability under bending of the pipe.

It may be seen from FIG. 2 that the portion 63 of the nose 23 beyond the seal-groove 25, which may be termed the snout portion of the nose, is axially longer than the between-the-grooves portion 65 of the nose. The benefit that arises from the presence of this long snout portion 63 may be explained as follows.

As described, the designer should have it in mind that when the pipe 16 bends, the distortion of the junction 20 can cause the O-ring seal to lose nip, and sometimes to leak.

During bending, much of the physical distortion of the nose actually takes place in the floor 56 of the seal groove 25, because the floor is so much thinner than the remainder of the nose. The snout portion 63 of the nose (beyond the seal-groove) for example, can be expected to distort hardly at all, by comparison, during bending of the junction.

The effect of making this snout portion long or short may be compared. If long, the snout portion 63 is well-constrained in and by the sleeve 21., with the result that the seal-groove 25, or at least the remote or snout end of the seal-groove, is held firmly in position relative to the inside surface 32 of the sleeve. Consequently, when the snout 63 is long, the seal 34 may be expected to remain in proper presentation with respect to the sleeve even though the pipe is bending. If the snout were short it would be possible for the snout to tip appreciably, and if that happened the snout would not help to keep the seal presented properly to the inside of the sleeve.

It may be noted that the pressure which is being sealed is generally the pressure of water outside the sleeve, so that in operation the seal is being forced, by the pressure, towards the snout end of the seal groove. When the snout is long, it is snout end of the seal groove which is being supported the most firmly.

The before-the-grooves, or shaft, portion 67 of the nose 23 is also long as compared with the between-the-grooves portion 65. The reason for this is that the abrupt change in cross-section between the tube proper and the nose can cause a stress concentration in the shaft portion of the nose, and the long shaft portion 67 ensures that such stress concentration is well-separated from the other stress concentration caused by the presence of the key-groove.

Figure 3:
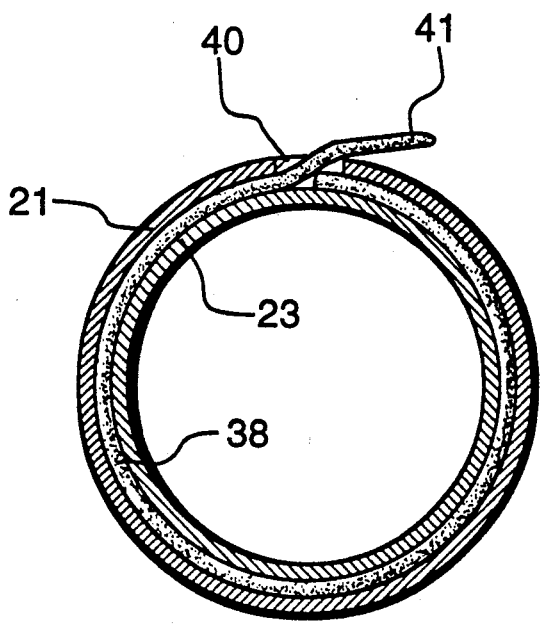
FIG. 3 is a cross-section on line 3—3 of FIG. 2.

As mentioned, the system as described in FIGS. 1-3 is aimed at permitting slim O-rings to be used: slimmer, that is to say, than the designer would normally be comfortable with. For a pipe in the diameter range of 5 or 6 cm, for instance, the O-ring can be a slim 3 mm in cross-sectional diameter.

The slim O-ring permits the wall thickness to be a minimum. In a typical system of the kind described, the overall wall thickness at the junction, i.e. the radial thickness of the sleeve and nose together, may be as little as 1/20th of the pipe diameter.

The thickness of the floor or base 56 of the seal-groove 25, being in the unstressed portion 58 of the nose, may be as little as 1/60th of the pipe diameter.

The key 38 has a radial thickness of about 1.5 mm, or roughly 1/35th of the pipe diameter.

I claim:

1. A jointing system for joining tubes together end-to-end, wherein:
    a female end of one of the tubes is formed with a cylindrical sleeve;
    a male end of an adjacent one of the tubes is formed with a complementary cylindrical nose, which is arranged to fit snugly inside the sleeve, and to be slidable into and out of the sleeve, and to be in direct locking engagement with the sleeve;
    the nose on the male end is provided with an inner key-groove, which is formed radially inwards into the material of the nose;
    the sleeve on the female end is provided with an outer key-groove, which is formed radially outwards into the material of the sleeve;
    the outer key-groove in the sleeve and the inner key-groove in the nose are so arranged as to be in axial alignment when the nose is fitted into the sleeve, whereby the inner and outer key-grooves together form a composite key-groove;
    the sleeve is provided with a key-hole right through the material of the sleeve, the key-hole being such that a key may be inserted therethrough,
    the size and disposition of the key-hole are such that the key is insertable from outside the sleeve tangentially with respect to the composite key-groove;
    the tubes are components of an elongate pipe assembly which is adapted and arranged for placing into a bore-hole in the ground, and is so arranged that, when the key is inserted into the key-groove, the weight of tubes below the joint is supported by the key;
    the tubes are of the kind wherein the tubes are suitable, upon installation of the elongate pipe assembly into the bore-hole from the ground surface, to be passed down into the borehole one by one, each tube as it is added to the assembly tube being locked to the adjacent tube by the insertion of the key into the groove through the keyhole;
    the shapes of the inner key-groove and the outer key-groove are such that, when the nose is assembled into the sleeve, the composite key-groove is square-sided;
    and the key is of a rectangular cross-sectional shape, which is complementary in size and shape to the composite key-groove.

2. Jointing system of claim 1, wherein the nature of the bore-hole, and the nature of the fit of the tubes within the borehole, are such that adjacent tubes are forced to lie at a misalignment angle, relative to each other, of at least one degree, and wherein the nature of the tubes is such that the forcing of the said misalignment angle on the tubes, and on the joints between adjacent tubes, is sufficient to place a substantial distortional strain on the joint.

3. Jointing system of claim 1, wherein the rectangular key is of plastic material.

4. Jointing system of claim 1, wherein the tubes are of plastic material.

5. Jointing system of claim 1, wherein the wall thicknesses of the sleeve and of the nose are such that the overall radial thickness of the joint is not more than about 1/20th of the pipe diameter.

6. Jointing system of claim 1, wherein the rectangular key has a radial thickness of about 1/35th of the pipe diameter.

7. Jointing system of claim 1, wherein the nose on the male end is provided with a seal-groove, which is formed radially inwards into the material of the nose, and an elastomeric seal is housed in the seal groove.

8. Jointing system of claim 7, wherein:
    the seal-groove and the composite key-groove are spaced apart axially along the length of the nose;
    and the seal-groove lies axially further out along the length of the nose than the composite seal-groove.

9. Jointing system of claim 8, wherein the axial length of the portion of the nose that lies between the seal-groove and the key-groove is shorter than the axial length of the portion of the nose that lies beyond the seal-groove.

10. Jointing system of claim 8, wherein the axial length of the portion of the nose that lies between the seal-groove and the key-groove is shorter than the axial length of the portion of the nose that lies before the key-groove.

11. Jointing system of claim 7, wherein the radial thickness of the material of the nose which comprises the base of the seal-groove is not less than about 1/60th of the pipe diameter.

12. Jointing system of claim 8, wherein the edges of the outer key-groove in the sleeve are chamfered to such an extent as to ease sliding of the seal past the edges of the outer key-groove when the nose is being inserted into the sleeve.

* * * * *